United States Patent [19]
Yoshiyama

[11] Patent Number: 5,461,608
[45] Date of Patent: Oct. 24, 1995

[54] RING NETWORK WITH TEMPORARY MASTER NODE FOR COLLECTING DATA FROM SLAVE NODES DURING FAILURE

[75] Inventor: Shunji Yoshiyama, Tokyo, Japan

[73] Assignee: NEC Corporation, Tokyo, Japan

[21] Appl. No.: 269,376

[22] Filed: Jun. 30, 1994

[30] Foreign Application Priority Data

Jun. 30, 1993 [JP] Japan .................................. 5-162173

[51] Int. Cl.⁶ .................................................... H04L 1/22
[52] U.S. Cl. ................................... 370/16.1; 340/825.15; 340/825.16; 370/85.6; 370/85.8; 370/85.15; 371/11.2; 395/184.01; 395/183.19; 395/185.02; 395/200.21; 395/200.05
[58] Field of Search ............................ 371/8.1, 8.2, 11.1, 371/11.2; 340/825.05, 825.08, 825.15, 825.16; 370/13, 16, 16.1, 61, 85.6, 85.8, 85.15

[56] References Cited

U.S. PATENT DOCUMENTS

| | | | |
|---|---|---|---|
| 4,737,957 | 4/1988 | Nohmi et al. ......................... | 370/11.2 |
| 4,975,914 | 12/1990 | Ashton et al. ......................... | 370/11.2 |
| 5,029,159 | 7/1991 | Dolov .................................... | 370/16.1 |
| 5,321,812 | 6/1994 | Benedict et al. ....................... | 370/16 |

*Primary Examiner*—Benedict V. Safourek
*Attorney, Agent, or Firm*—Sughrue, Mion, Zinn, Macpeak & Seas

[57] ABSTRACT

In a ring network where network nodes are interconnected by an optical fiber ring, one of the nodes acts as a master node and each of the other nodes acts as a slave node. The master node successively designates a different slave node in a descending order of priorities, transmits a command message to the designated slave node, and updates its memory with a response message from the designated node. If the command message is received, each designated slave node updates its memory with data contained in the command message and returns a response message to the master node. If the command message is not received, each slave node, acting as a temporary master node, designates a different one of the other slave nodes in descending order, transmits a command message to each designated node, and updates its memory with a response message therefrom. Each temporary master node repeats the process until it receives a command message from another temporary master node having a priority higher than the priority of the sending node.

14 Claims, 4 Drawing Sheets

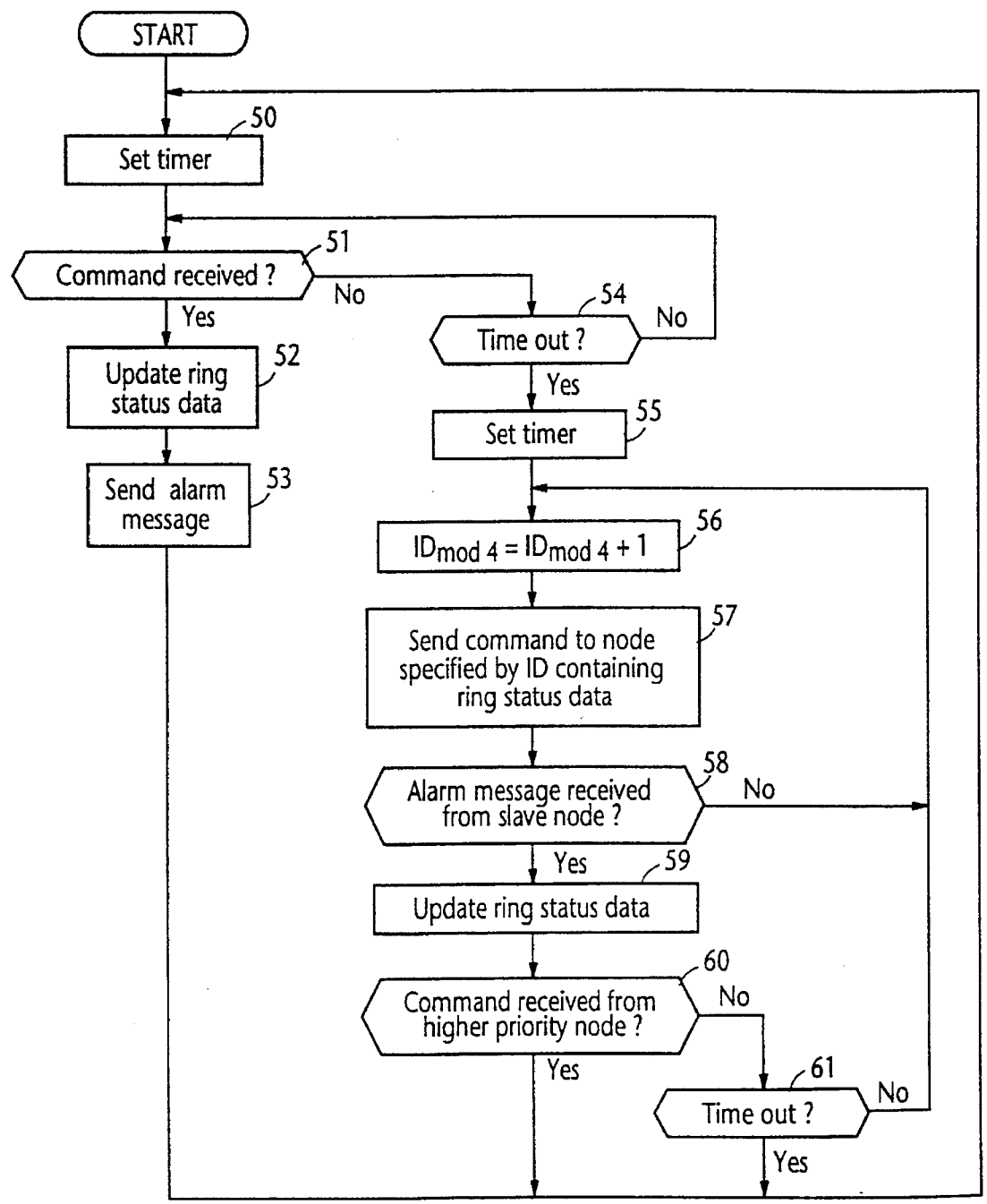

RING NETWORK WITH TEMPORARY MASTER NODE FOR COLLECTING DATA FROM SLAVE NODES DURING FAILURE

BACKGROUND OF THE INVENTION

1. Field of the Invention

The present invention relates generally to ring networks in which network nodes are interconnected by a ring transmission medium, and more specifically to an information collection technique for the ring network.

2. Description of the Related Art

In the conventional SONET/SDH (synchronous optical network/synchronous digital hierarchy) ring network, each network node holds its own management information. If the network node desires to monitor another network node, it attempts to establishes an inter-node communication path to a maintenance terminal via some intermediate node to access the management information of the desired node. As a result, a substantial amount of time is taken to obtain the necessary maintenance, or alarm message when a trouble occurs in the ring network.

SUMMARY OF THE INVENTION

It is therefore an object of the present invention to provide a ring communication network in which network nodes are interconnected by a ring transmission medium, the network being capable of quickly establishing a communication path from one of the nodes to other nodes when a command message is not received from a predetermined node.

According to a first aspect, the present invention provides a communication network comprising a ring transmission line and a plurality of network nodes interconnected by the line, one of the nodes acting as a master node and having a master memory, and each of the other nodes acting as a slave node and having a memory. The master node successively sends a first command message containing data stored in the master memory to each of the slave nodes and updates the master memory with a response message returning from each of the slave nodes, the response message indicating particular information of the slave node. Each of the slave nodes updates its memory with the data from the master node if the first command message is received, and returns a response message of the slave node to the master node. If the first command message is not received, each slave node acts as a temporary master node and successively sends a second command message containing data of the memory of the slave node to a different one of the slave nodes, and updating the memory of the sending slave node with a response message returning from each slave node, the data contained in a subsequent transmission of the second command message being a version of the data updated by a response message returning in response to a previous transmission of the second command message. On receiving the second command message, each slave node returns a response message of the slave node.

According to a second aspect, the present invention provides a communication network comprising a ring transmission line and a plurality of network nodes interconnected by the line, one of the nodes acting as a master node and having a master memory, and each of the other nodes acting as a slave node and having a memory, wherein the slave nodes have different priorities. The master node successively sends a first command message containing data stored in the master memory to each of the slave nodes in a descending order of the priorities and updates the master memory with a response message returning from each of the slave nodes, the response message indicating particular information of the slave node. Each of the slave nodes updates the memory of the slave node with the data contained in the first command message if it is received, and returns a response message of the slave node to the master node. If the first command message is not received, each slave node acts as a temporary master node and successively sends a second command message containing data of the memory of the slave node to a different one of the slave nodes until a second command message is received from a slave node whose priority is higher than the priority of the sending node, and updates the memory of the sending node with a response message returning from each slave node, the data contained in a subsequent transmission of the second command message being a version of the data updated by a response message returning in response to a previous transmission of the second command message. Each slave node returns a response message of the slave node on receiving the second command message from a slave node whose priority is higher than the priority of the slave node.

BRIEF DESCRIPTION OF THE DRAWINGS

The present invention will be described in further detail with reference to the accompanying drawings, in which:

FIG. 4 is a flowchart describing a sequence of programmed operations performed by each slave node.

DETAILED DESCRIPTION

Figure 1:
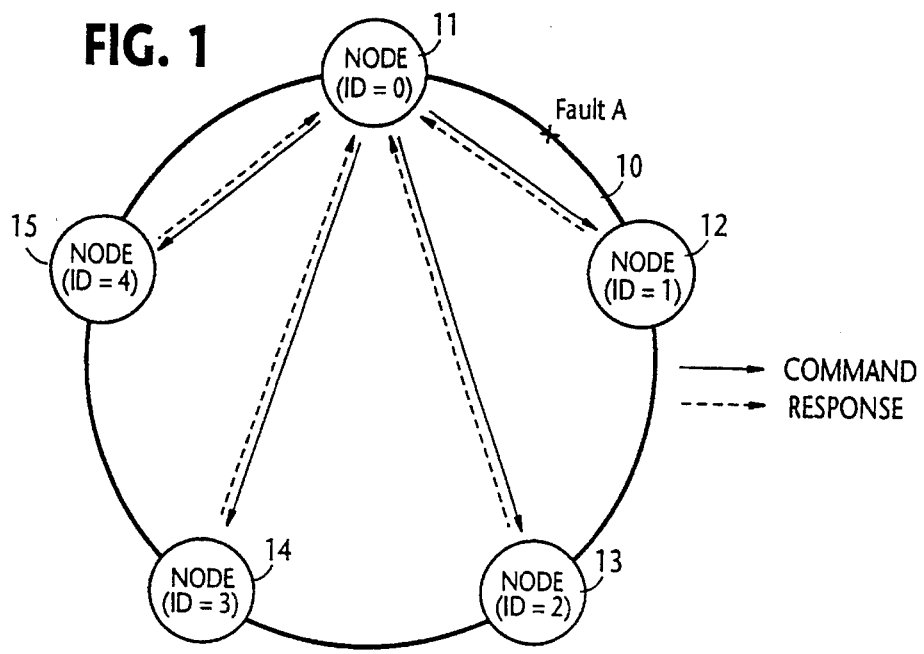
FIG. 1 is a block diagram of a simplified SONET/SDH ring network in which the present invention is embodied.

Referring now to FIG. 1, there is shown an exemplary SONET/SDH ring network in which the present invention is embodied. The network comprises an optical ring transmission cable 10 and a plurality of network nodes 11, 12, 13, 14 and 15 interconnected by sections of the optical ring 10. The ring 10 is capable of sending signals in clockwise and counterclockwise directions, Network nodes 11 to 15 are identified by node identifiers ID=0, 1, 2, 3 and 4, respectively, According to the present invention, one of the network nodes acts as a permanent master node and the remainder as slave nodes. The node having the least value of identifier is the master node. In the illustrated embodiment, network node 11 is the master node and the other nodes as slave nodes. As described later, if a fault occurs in one of the sections of the ring, priority is given to another node to act as a temporary master node in place of the master node 11. The function of the permanent master node or temporary master node is to collect management information (or node status information) from each of the slave nodes and updates its ring status information and notifies it to all of the other slave nodes so that all the nodes of the ring network share the same ring status information.

Figure 2:
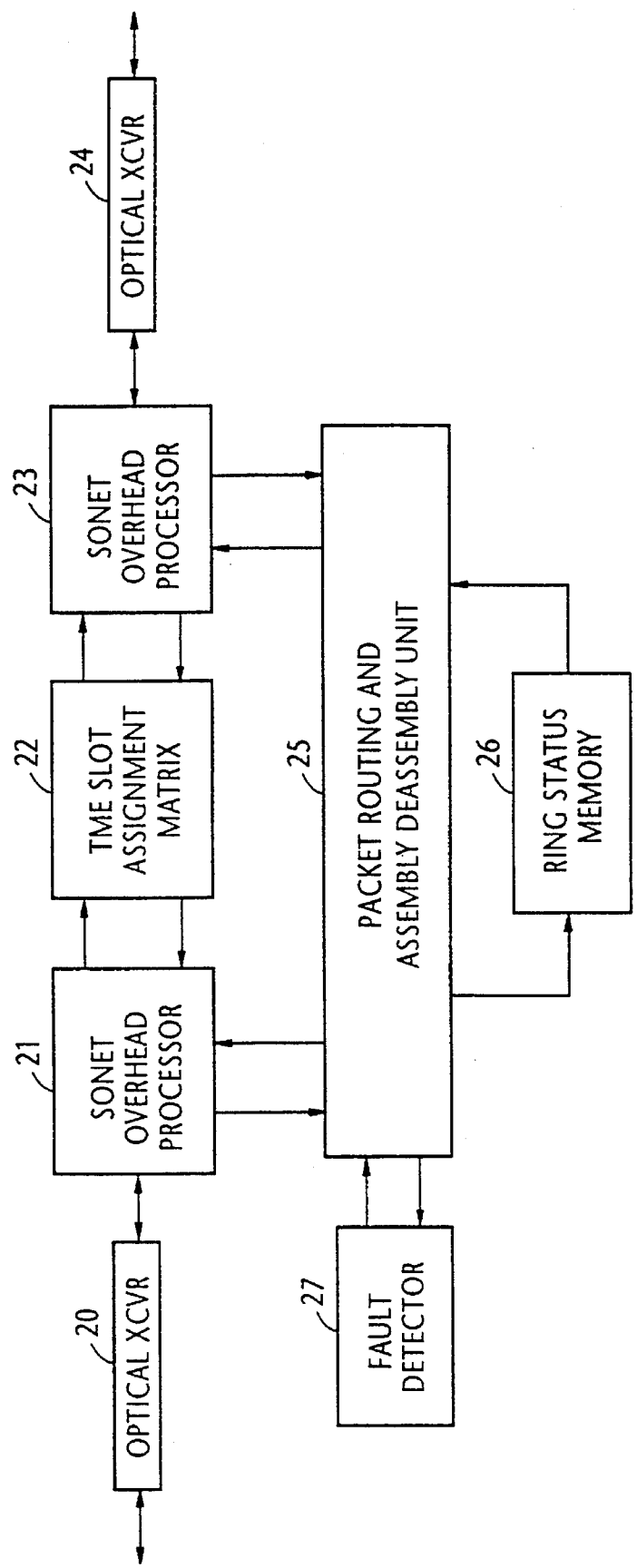
FIG. 2 is a block diagram of each of the network nodes.

As shown in FIG. 2, each of the nodes 11 to 15 comprises a pair of optical transceivers 20 and 24 each interfacing the corresponding section of the ring 10, a pair of SONET overhead processors 21 and 23 respectively connected to the optical transceivers 20 and 24, and a time slot assignment matrix 22 connected between the overhead processors 21 and 23. A packet routing and assembly deassembly unit (PRAD) 25 is connected to the SONET overhead processors 21, 23, and a ring status memory 26 is connected to the packet routing and assembly deassembly unit 25. A fault detector 27 is connected to the PRAD unit 25.

In each network node, a SONET/SDH packet received by optical transceiver 20 (24) from a source node is applied to the overhead processor 21 (23) where the data contained in the the overhead of the packet is extracted and processed in known manner. Following the overhead processing, the SONET main data of the received packet is applied to the time slot assignment matrix 22 to assign time slots so that the packet can be added to or dropped from the node or passed therethrough to the next node. At periodic intervals, each of the network nodes monitors its own operating states and stores an alarm message representing the operating states.

The extracted overhead of a packet is compared with the identifier of the node. If they match, a message from the source node is extracted from the packet, applied to the PRAD unit 25 and a response packet is returned to the source node according to the content of the message. If the message from the source node is a command for collecting the alarm message of the slave node, it is accompanied with the ring status information collected by the master node, and the receiving node updates the ring status memory 26 and returns an alarm message indicating the status of the slave node as a response to the source node acting as the master node. At periodic intervals, the master node transmits an alarm collecting command message to each of the slave nodes. If each of the slave nodes fails to receive a command message during a specified interval, the fault detector 27 determines that a fault has occurred in an incoming section of the ring and notifies this fact to the PRAD unit 25 to change the status of the node to "temporary master node".

If the extracted overhead of a packet received from one overhead processor does not match the identifier of the node, the packet is transferred to the other overhead processor and sent to the next node under the control of PRAD unit 25. The PROD unit 25 at master node 11 is programmed to execute a routine of instructions shown in FIG. 3 and the PRAD unit 25 of each slave node is programmed to execute a routine of instructions shown in FIG. 4 for exchanging command-response messages.

Figure 3:
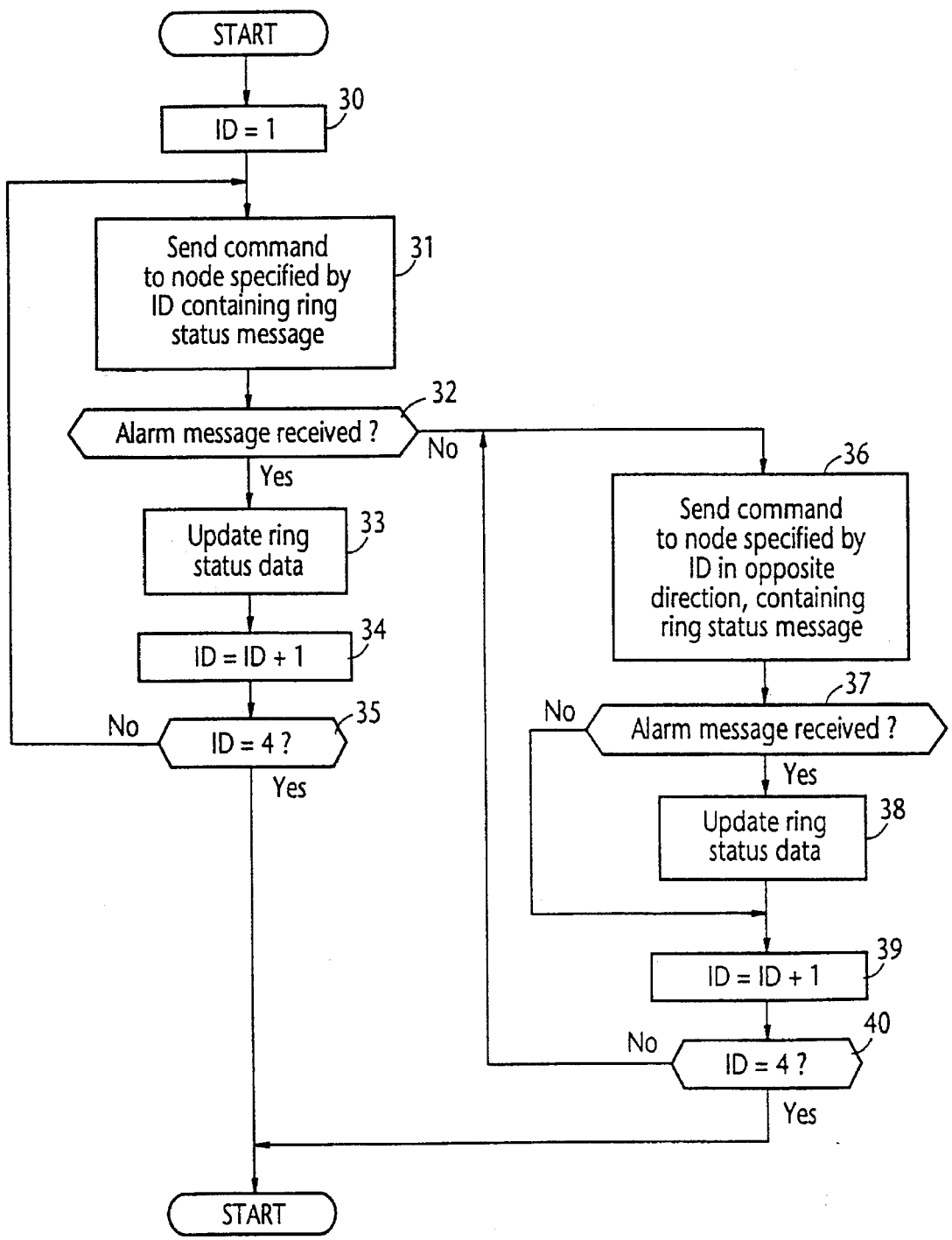
FIG. 3 is a flowchart describing a sequence of programmed operations performed by the permanent master node.

Permanent master node 11 invokes the routine of FIG. 3 at periodic intervals to send a command message to a slave node and receive a response message. Specifically, the program execution of master node 11 starts with the setting of slave node identifier ID to 1 (step 30). Exit then is to step 31 to send an alarm collection command message from the master node 11 in a clockwise direction to the node 12, containing the destination node ID=1 and the data stored in the ring status memory 26. Exit then is to step 32 to check to see if an alarm message is received from the node 11. If the answer is affirmative at step 32, control exits to step 33 to update the ring status memory 26 at master node 11 according to the received alarm message of node 12. At step 34, the ID value is incremented by one, and checked to see if ID is equal to the maximum value 4. If the answer is negative, control returns to step 31 to repeat the process, so that an alarm collection command message is sent to the next node 13 to collect its alarm message. The same process is continued until alarm messages are returned from all slave nodes if there is no fault in the transmission ring 10.

If the answer at decision step 32 is negative, the fault detector 27 determines that a fault has occurred in the optical ring 10 and control branches to step 36 to send the same command message to the node 15 in a counterclockwise direction. If an alarm message is received from node 15, the master node 11 updates the data in its ring status memory 26 (step 38), and increments ID by one (step 39) and repeats the process until ID becomes equal to 4 at step 40. If a negative decision is made at step 37, control executes steps 39 and 40 and sends the command message to the next node.

In FIG. 4, the program execution at each of the slave nodes begins with the setting of a timer at step 50. If a command message is received (step 51), the slave node updates the data in its ring status memory 26 according to the alarm message that accompanies the command message (step 52), sends the alarm message of the slave node to the master node 11 (step 53), and returns to the starting point of the routine.

If a command message is not received at step 51, control branches to step 54 to determine whether the time-out period of the timer has expired. If not, control returns to step 51 to wait for the command message. If no command message is received within the period of the timer, the slave node recognizes that a fault has occurred in the ring 10 and acts as a temporary master node by restarting the timer at step 55. Exit then is to step 56 to increment the unique ID value of the slave node by one and send an alarm collection command message together with the data stored in its ring status memory to a slave node identified by the incremented ID value. At step 58, the temporary master node checks to see if an alarm message is received from the slave node. If the answer is affirmative, control branches at step 58 to step 59 to update its ring status memory according to the received alarm message. Exit then is to step 60 to check to see if a command message is received from a higher priority node. If the answer is negative, control branches at step 60 to step 61 to check to see if the timer has expired. If not, control returns to step 56 to increment the ID value by one to send out a command message to the next lower priority slave node. The process is continued until the timer expires (step 61) if no command message is received from a higher priority node.

The operation of the SONET/SDH ring network of this invention 18 will be fully understood with the following description with reference to FIGS. 1, 5A, 5B and 5C. If a fault A has occurred between nodes 11 and 12, the command message sent from the master node 11 in the clockwise direction is not received within the time-out period by node 11 (step 32), and the latter changes the direction of message transmission at step 36 and sends the command message to node 15 in the counterclockwise direction. Thus, steps 37 to 40 are successively executed to exchange command and alarm messages between master node 11 and each of the slave nodes 12 to 15. As the command and response messages are exchanged at periodic intervals, the master node collects all alarm information from each slave node if there is no or only one fault in the ring transmission line 10, and each network node holds in its ring status memory all of the alarm data of each of the other network nodes.

Figure 5A:
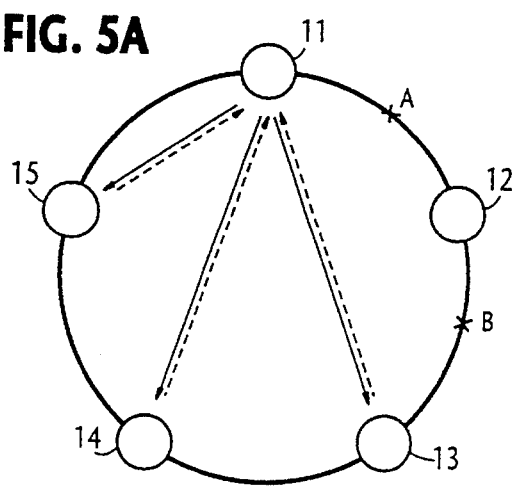
FIGS. 5A, 5B and 5C are illustrations useful for describing the operations of the network when faults occur at different ring sections.
Figure 5B:
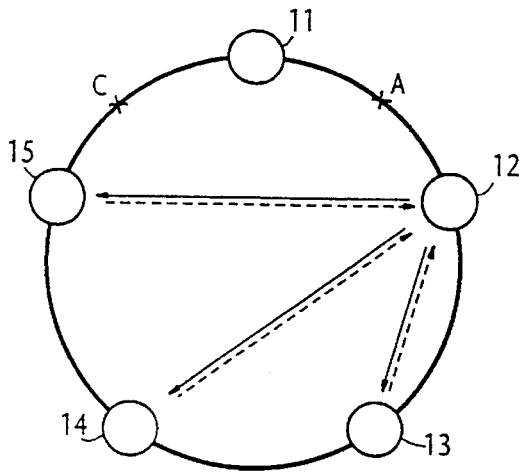

If a fault B occurs between nodes 12 and 13 in addition to the fault A as shown in FIG. 5A, the master node 11 fails to receive a response from node 12, but receives a response from node 13 to proceed with the sending of a command message and the receiving of an alarm message to and from slave nodes 13 to 15 until the ID=4 at step 40.

If a fault C occurs between nodes 11 and 15, in addition to the fault A (FIG. 5B), the timer at each of nodes 12 to 15 expires at step 54 and control of these nodes proceeds to set the timer at step 55 to start acting as a temporary master nodes independently of each other and increments its ID (=1) by one and sends a command message from node 12 to node 13 from node 13 to node 14 and from node 14 to node 15. In response to the command message from node 12, the node 13 quits step 60 to return to step 50, recognizing that the node 12 is the temporary master node. Likewise, the reception of the command message from node 13 by node 14 causes the latter to return to the starting point of the routine, and the reception of the command message from node 14 by node 15 causes the latter to return to the starting point of the routine as well. The transmission of further command messages continues at the temporary master node 12 until the timer expires so that node 12 exchanges command and alarm messages with slave nodes 13, 14 and 15 as indicated by solid- and broken-line arrows in FIG. 5B, and nodes 14 and 15 recognize that node 12 is the temporary master node.

Figure 5C:
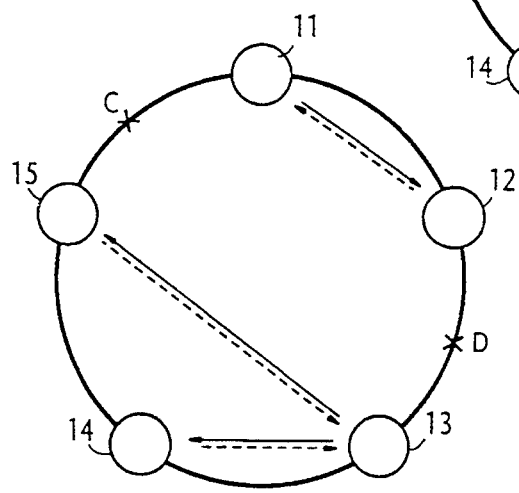

If a fault D occurs between nodes 12 and 13 in addition to fault C as shown in FIG. 5C, the permanent master node 11 will exchange command and alarm messages with node 12, but fails to establish communication with the other nodes. In place of permanent master node 11, the node 13 now serves as a temporary master node for nodes 14 and 15. Thus, at node 13 steps 56 to 61 are executed twice before its timer expires, while at nodes 14 and 15 steps 56 to 60 are executed only once.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A communication network comprising a ring transmission line and a plurality of network nodes interconnected by the line, one of the nodes acting as a master node and having master memory, and each of the other nodes acting as a slave node and having a memory, said master node including means for successively sending a first command message containing data stored in the master memory to each of the slave nodes, receiving a response message therefrom, and updating the master memory with the response message, said response message indicating particular information of each of the slave nodes, each of the slave nodes comprising:
  receive means for receiving signals from said transmission line;
  means for updating the memory of the slave node with the data from the master node if the first command message is received by said receive means, and returning said response message of the slave node to the master node;
  means for successively sending a second command message containing data of the memory of the slave node to a different one of the slave nodes if the first command message is not received within a timeout period, and updating the memory of the sending slave node with said response message returning from each slave node, the data contained in a subsequent transmission of said second command message being a version of the data updated by a response message returning in response to a previous transmission of said second command message; and
  means for returning said response message of the slave node on receiving said second command message via said receive means.

2. A communication network as claimed in claim 1, wherein said response message contains management information of the slave node from which the response message is transmitted.

3. A communication network as claimed in claim 1, wherein said ring transmission line is an optical transmission medium.

4. A communication network as claimed in claim 1, wherein said means for successively sending said first command message comprises means for sending said first command message in a direction opposite to a direction in which the first command message is initially transmitted if no response message is returned from a first one of the slave nodes.

5. A communication network comprising a ring transmission line and a plurality of network nodes interconnected by the line, one of the nodes acting as a master node and having master memory, and each of the other nodes acting as a slave node and having a memory, said slave nodes having different priorities, said master node including means for successively sending a first command message containing data stored in the master memory to each of the slave nodes in a descending order of said priorities, receiving response therefrom, and updating the master memory with the response message, said response message indicating particular information of the slave node, each of the slave nodes comprising:
  receive means for receiving signals from said transmission line;
  means for updating the memory of the slave node with the contained in the first command message if the same is received by said receive means, and returning the response message of the slave node to the master node;
  means for successively sending a second command message containing data of the memory of the slave node to a different one of the slave nodes if the first command message is not received until said second message is received by said receive means from a slave node whose priority is higher than the priority of the sending slave node, and updating the memory of the sending slave node with said response message returning from each slave node, the data contained in a subsequent transmission of said second command message being a version of the data updated by a response message returning in response to a previous transmission of said second command message; and
  means for returning the response message of the slave node on receiving said second command message from a slave node whose priority is higher than the priority of the slave node.

6. A communication network as claimed in claim 5, wherein said response message contains management information of the slave node from which the response message is transmitted.

7. A communication network as claimed in claim 5, wherein said ring transmission line is an optical transmission medium.

8. A communication network as claimed in claim 5, wherein said means for successively sending said first command message comprises means for sending said first command message is in a direction opposite to a direction in which the first command message is initially transmitted if no response message is returned from a first one of the slave nodes.

9. In a communication network comprising a ring transmission line and a plurality of network nodes interconnected by said line, one of said nodes operating as a permanent master node having a master memory and generating a first command message containing data stored in the master memory, and each of the other nodes having a memory and operating as a temporary master node for generating a second command message containing data stored in the memory thereof, or as a slave node for generating a response message in response to the first or second command message indicating particular information of the slave node, a method comprising the steps of:

a) at said permanent master node, successively sending said first command message from said permanent master node to each of the slave nodes, and updating the master memory with said response message returning from the slave node;

b) at each one of said slave nodes, determining whether said first command message is received or not;

c) if said first command message is determined to be received, updating the memory of the slave node with the data contained in the first command message, and returning said response message from the slave node to said permanent master node;

d) if said first command message is determined to be not received, operating the slave node as said temporary master node by sending said second command message to a different one of other slave nodes;

e) updating the memory of the temporary master node with said response message returning from said one slave node; and f) repeating the steps (d) and (e).

10. A method as claimed in claim 9, wherein said response message contains management information of the slave node from which the response message is transmitted.

11. A method as claimed in claim 9, wherein the step (a) further comprises the steps of sending said first command message from said permanent master node to each slave node in a first direction, and sending said first command message from said permanent master node to the slave node in a second, opposite direction if no response message is returned in response to the first command message transmitted in the first direction.

12. In a communication network comprising a ring transmission line and a plurality of network nodes having different priorities interconnected by said line, one of said nodes acting as a permanent master node having a master memory and generating a first command message containing data stored in the master memory, and each of the other nodes having a memory and acting as a temporary master node for generating a second command message containing data stored in the memory thereof, or as a slave node for generating a response message in response to the first or second command message, said response message indicating particular information of the slave node, a method comprising the steps of:

a) at said permanent master node, successively sending said first command message in a descending order of said priorities to each of the slave nodes, and updating the master memory with said response message returning from the slave node;

b) at each one of said slave nodes, determining whether said first command message is received or not;

c) if said first command message is determined to be received, updating the memory of the slave node with the data contained in the first command message, and returning said response message from the slave node to said permanent master node;

d) if said first command message is determined to be not received, operating the slave node as said temporary master node by sending said second command message to a different one of other slave nodes;

e) updating the memory of the temporary master node with said response message returning from said one slave node; and f) repeating the steps (d) and (e) until said second command message is received from a slave node whose priority is higher than the priority of the temporary master node.

13. A method as claimed in claim 12, wherein said response message contains management information of the slave node from which the response message is transmitted.

14. A method as claimed in claim 12, wherein the step (a) further comprises the steps of sending said first command message from said permanent master node to each slave node in a first direction, and sending said first command message from said permanent master node to the slave node in a second, opposite direction if no response message is returned in response to the first command message transmitted in the first direction.

* * * * *

UNITED STATES PATENT AND TRADEMARK OFFICE
CERTIFICATE OF CORRECTION

PATENT NO. : 5,461,608
DATED : October 24, 1995
INVENTOR(S) : Shunji YOSHIYAMA

It is certified that error appears in the above-indentified patent and that said Letters Patent is hereby corrected as shown below:

Col. 3, line 56, delete "the data", insert --ring status--.

Signed and Sealed this

Eleventh Day of June, 1996

Attest:

BRUCE LEHMAN

*Attesting Officer*     *Commissioner of Patents and Trademarks*